June 5, 1928.
R. V. PROCTOR
ARTICLE OF MANUFACTURE
Filed Feb. 17, 1926      2 Sheets-Sheet 1
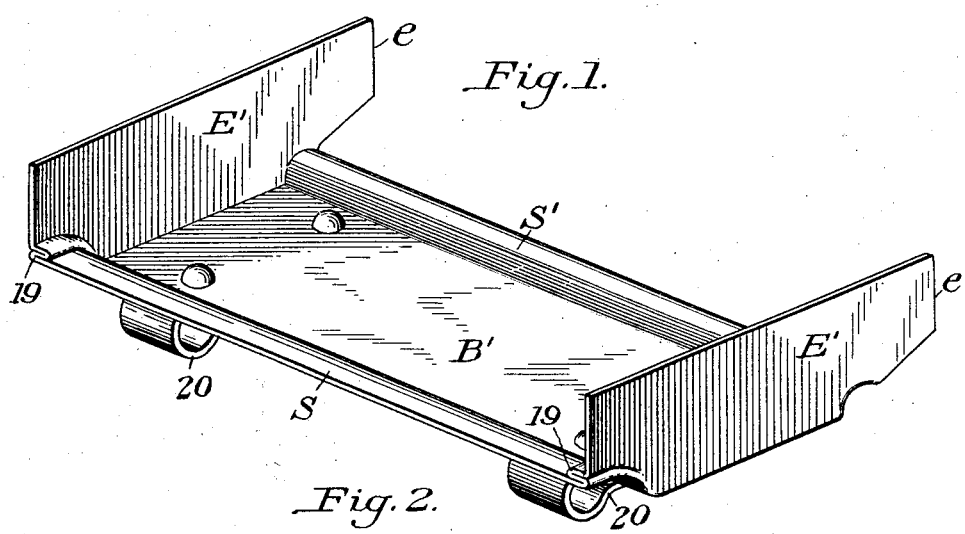
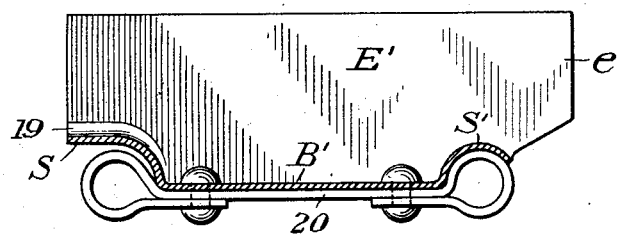
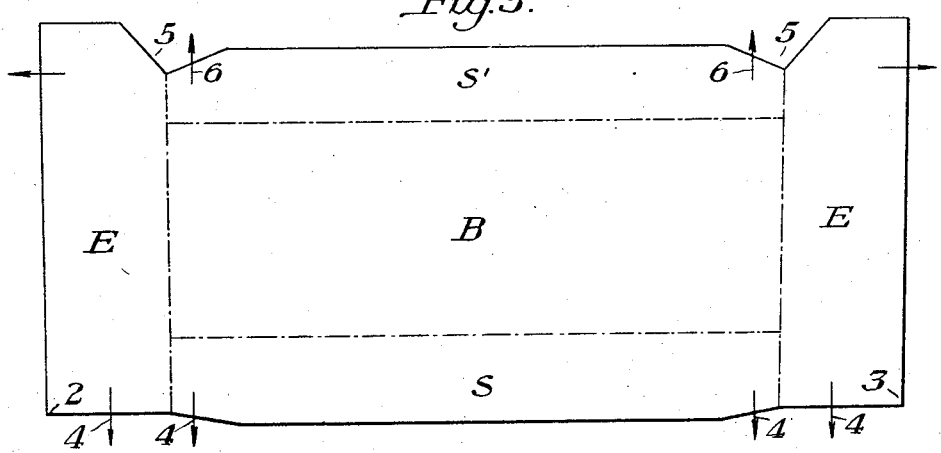
INVENTOR
Robert V. Proctor
by his attorneys

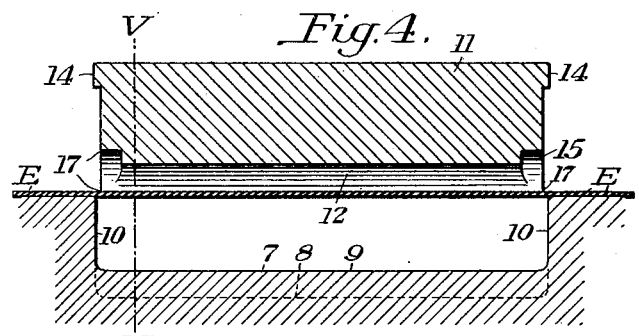
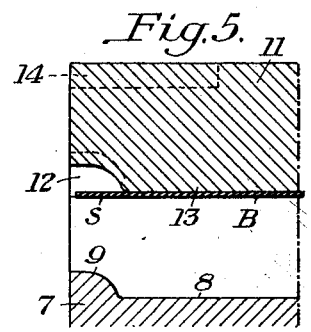
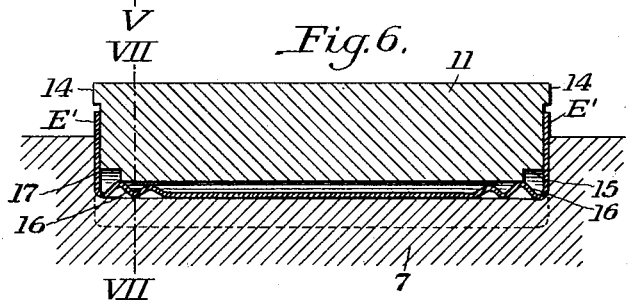
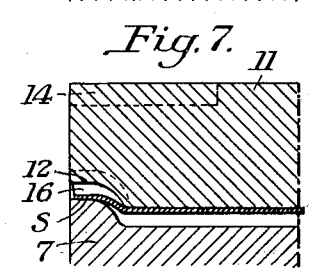
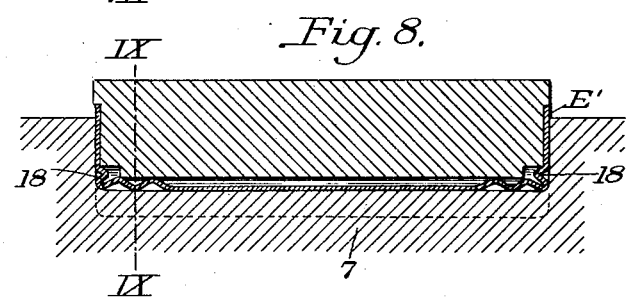
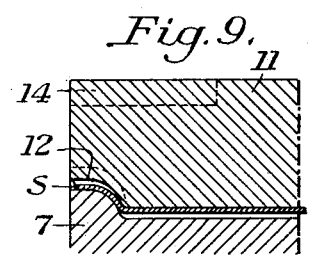
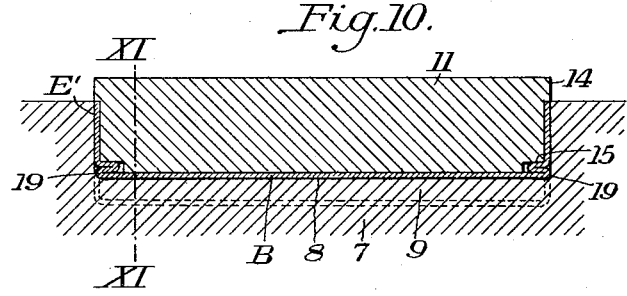
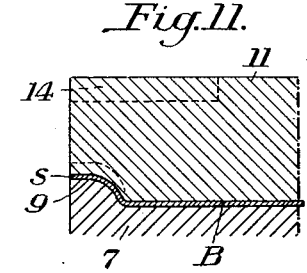

Patented June 5, 1928.

1,672,730

UNITED STATES PATENT OFFICE.

ROBERT V. PROCTOR, OF YOUNGSTOWN, OHIO, ASSIGNOR TO THE COMMERCIAL SHEARING & STAMPING COMPANY, OF YOUNGSTOWN, OHIO, A CORPORATION OF OHIO.

ARTICLE OF MANUFACTURE.

Original application filed July 16, 1924, Serial No. 726,315, now Patent No. 1,663,316, dated March 20, 1928. Divided and this application filed February 17, 1926. Serial No. 88,828.

The present invention relates broadly to sheet metal work, and more particularly to conveyor pans of the character used in conveying bulk material such as coal.

It has heretofore been customary in the art to which the present invention relates, to make conveyor pans of the particular type herein contemplated, by punching and cutting a sheet of metal, thereafter bending it to shape, and then welding the meeting edges, or by welding together a plurality of separate pieces. These pans, while generally satisfactory in use, have been relatively expensive by reason of the separate welding steps required.

In accordance with the present invention the objections referred to are obviated and I am enabled to provide a one piece pan entirely free from welds, thereby not only insuring greater strength, or at least uniformity of strength, but also an increased production at a correspondingly decreased cost. These advantages are obtained by the shape of the blank utilized, by the construction of the dies employed for the shaping operation, and by the control of the flow of the metal during the shaping of the blank.

In the accompanying drawings there is shown for purposes of illustration only a preferred form of my improved article, it being understood that the drawings do not define the limits of my invention as changes may be made in the construction and operation disclosed therein without departing from the spirit of the invention or scope of my broader claims.

In the drawings—

Figure 1 is a perspective view of a completed pan constructed in accordance with the present invention;

Figure 2 is a transverse sectional view through the pan shown in Figure 1;

Figure 3 is a plan view of a blank suitable for producing a pan as herein disclosed;

Figure 4 is a longitudinal sectional view through a pair of dies for forming the blank, the blank being shown in position on the female die;

Figure 5 is a transverse sectional view through a portion of the dies, the section being taken on the line V—V of Figure 4;

Figures 6 and 7 are views corresponding respectively to Figures 4 and 5, but illustrating the dies at an intermediate stage during the formation of the pan;

Figures 8 and 9 are views corresponding respectively to Figures 6 and 7, but illustrating still another stage in the production of the pan, and Figures 10 and 11 are views corresponding to Figures 8 and 9 illustrating the dies in their final forming position.

I have found that by properly shaping the dies utilized in the production of a conveyor pan of the character herein disclosed, it is possible to first produce a series of vertical corrugations in certain portions of the blank, and thereafter cause these corrugations to travel endwise and thereby form horizontally extending super-imposed folds. These folds represent the excess metal which heretofore has been removed by splitting or cutting the blank, thereby necessitating a welding operation.

In Figure 3 there is illustrated one form of blank suitable for producing the pan illustrated in Figures 1 and 2. In this figure there is illustrated a central bottom portion B adapted to form the bottom B' of the conveyor pan and end portions E adapted to form the ends E' of the finished pan. Along each edge of the blank there are side portions $s$ and $s'$ adapted to form the upwardly curved edges S and S' respectively of the finished pan. The lines on which the blank is folded in producing the parts referred to are indicated by chain lines in Figure 3.

It will be noted that the blank is illustrated as having certain portions thereof adjacent each of the corners 2 and 3 cut away. In Figure 3 I have shown arrows 4 adapted to indicate the direction of flow of the metal during the formation of the pan whereby these corners are filled out to produce the completed pan having substantially straight side edges. On the opposite side of the blank there are reentrant portions 5. These reentrant portions not only insure the production of overhanging or projecting portions $e$ in the completed pan, but also permit the metal to flow laterally as indicated by the arrows 6.

After the blank has been cut, it is laid across a female die 7 as shown in Figures 4 and 5 having a depressed central portion 8 and upwardly curved side edges 9 enclosed within vertically extending ends 10. This blank is then engaged by male die 11 having its side edges formed with grooves 12 adapted to cooperate with the upwardly curved side edges 9 and with a central portion 13 adapted to enter the depression 8 and form the bottom B of the pan. The die 11 is preferably provided on each end thereof throughout a portion of its width with a shoulder 14 adapted to engage the ends E' of the pan and prevent any tendency of the metal to flow upwardly adjacent the side edge S. The male die is also preferably formed with cut away corners 15 adapted to accommodate the surplus metal, as will be hereinafter more fully apparent.

It will be understood that the conveyor pans produced by the present invention are adapted to be used in accordance with the usual practice, with the projecting portions e of one pan extending outside of the end flanges E' of the pan on one side thereof, and with the side edge S overlapping the side edge S' of a pan on the other side. In view of this cooperation, it is unnecessary to have the edge S' either as deep or as wide as the edge S, and comparatively little difficulty is encountered in the formation thereof with a blank of proper shape and with dies tending to prevent any undesirable flow of the metal. Due, however, to the dimensions through the side edge S as compared with the dimensions through the longitudinal center of the pan, a considerable problem is involved in the making of this edge. I have found that best results can be accomplished by first confining the blank in such manner as to produce a plurality of vertically extending corrugations and thereafter acting upon the blank to first cause these corrugations to travel endwise and decrease in size and to thereafter form super-imposed folds which are pressed into position. Figures 4 to 11 of the drawings deal more particularly with the portions of the dies having to do with the formation of edge S. It will be apparent, however, that if it is desired for any reason to increase the dimensions of the edge S', the two sides of the dies may be correspondingly shaped and the metal on both edges of the blank uniformly acted upon.

After the parts have been brought into cooperative relation as illustrated in Figures 4 and 5, the male die is lowered causing it to depress the central portion B of the blank and thereby produce the upstanding ends E' which serve as strengthening beams during the continued shaping of the pan. The descent of the male die is continued until the edge portion s of the blank is brought into engagement with the upwardly curved edge 9 of the female die. Thereafter the further descent of the portion s will be checked, while the portion B of the blank will continue downwardly. Due to the fact that the depth of the depression in the female die above the edge 9 is considerably less than that through the central portion, the surplus metal above the edge 9 adjacent the ends of the blank is caused to form a plurality of vertical corrugations 16. As the travel of the die continues, the distance between the bottom of the groove 12 and the top of the edge 9 diminishes, thereby tending to flatten out the corrugations 16. This flattening out causes the corrugations to travel endwise of the blank into the space provided by the notches or recesses 15.

The male die is preferably provided with relatively sharp corners 17 at the ends thereof which corners tend to bite into the metal forming the ends E' and prevent the metal from flowing upwardly past the male die. This tendency is further overcome by providing the die with the shoulders 14 which overlap the end portions E of the blank and cause them to remain of substantially constant width. The width of the end portions E is also such that an effective reinforcing beam is provided of sufficient strength to partially overcome this tendency independently of the shoulders 14. Just before the dies come into the final registration, as illustrated in Figure 8, the end corners buckle inwardly to form corrugations 18, and accommodate the excess metal represented by the vertical corrugations. All of these corrugations are flattened out to form super-imposed folds 19 during the final movement of the dies into the position shown in Figures 10 and 11.

Due to the action of the stiff ends, and the shoulders 14, and the relatively small space provided by the notches 15, a portion of the metal is caused to flow outwardly as indicated by the arrows 4 in Figure 3. This action tends to widen out the pan adjacent the ends so that in the finished pan the edge S is substantially straight as shown in Figure 1.

The beam action exerted by the end portions E during the formation of the pan is sufficient of itself, in combination with the sharp corners on the male die as before referred to, to prevent the metal from flowing upwardly in the ends above the edge S'. The metal being thus confined is caused to flow laterally as indicated by the arrows 6, the surplus metal thus tending to fill out the contour of the pan without the formation of any folds as is involved in the formation of the edge S. In the form of pan illustrated, this is of considerable importance, as it is desirable to have a relatively smooth upper surface on the edge S' against which the under side of the edge S of an adjacent pan may bear.

After the pan has been completed, there may be secured thereto in any desired manner links 20 by means of which the adjacent pans may be secured together and the driving thereof effected.

The present application constitutes a division of my copending application, Serial No. 726,315, filed July 16, 1924, and in which there is now specifically claimed the method of making the improved article herein disclosed.

The advantages of the present invention arise from the formation of a conveyor pan from a single piece of metal entirely free from any welds.

I claim:

1. As an article of manufacture, a one-piece conveyor pan having a bottom, upstanding ends, and upwardly curved edges extending lengthwise of the pan, at least one of said edges having integral folds at its junction with the upstanding ends to accommodate any excess metal.

2. As an article of manufacture, a one-piece conveyor pan having a bottom, upstanding ends, and upwardly curved edges extending lengthwise of the pan, at least one of said edges having inwardly extending folds at its junction with the upstanding ends to accommodate any excess metal.

3. As an article of manufacture, a one-piece conveyor pan having a bottom, upstanding ends, and upwardly curved edges extending lengthwise of the pan, at least one of said edges having folds at its junction with the upstanding ends, said folds overlying a portion of the edges within the pan and accommodating any excess metal.

4. As an article of manufacture, a one-piece conveyor pan having a bottom, upstanding ends, and at least one upwardly curved edge extending lengthwise of the pan, said edge being of triple thickness adjacent each end thereof.

5. As an article of manufacture, a one-piece conveyor pan, having a bottom, upstanding ends, and at least one upwardly curved edge, said edge at its junction with the ends having a plurality of folds therein.

6. As an article of manufacture, a conveyor pan having a bottom, upstanding ends, and upwardly curved edges extending lengthwise of the pan, at least one of said edges having a reinforcing corrugation adjacent its junction with the upstanding ends.

7. As an article of manufacture, a conveyor pan having a bottom, and upwardly curved edges extending lengthwise of said bottom, at least one of said edges having reinforcing corrugations adjacent its opposite ends.

8. As an article of manufacture, a one-piece conveyor pan having a bottom and upstanding ends, at least a portion of the bottom being connected to said ends by means of folds in the metal.

9. As an article of manufacture, a one-piece conveyor pan having a bottom and upstanding ends, at least a portion of the bottom being connected to said ends by means of folds extending a distance less than the dimension of the pan in the direction of their extension.

10. As an article of manufacture, a conveyor pan having a bottom, upstanding ends, and upwardly curved edges extending lengthwise of the pan and of less width than the width of the pan, at least one of said edges having a reinforcing corrugation adjacent its junction with the upstanding ends, said corrugation having a length substantially equal to the width of the curved edge.

In testimony whereof I have hereunto set my hand.

ROBERT V. PROCTOR.